May 28, 1968 W. H. MEIKLEJOHN 3,386,089

APPARATUS FOR CONVERTING INFORMATION TO BINARY DIGITAL FORM

Filed June 1, 1964

Inventor:
William J. Meiklejohn,
by Edward D. Murphy
His Attorney.

United States Patent Office 3,386,089
Patented May 28, 1968

3,386,089

APPARATUS FOR CONVERTING INFORMATION TO BINARY DIGITAL FORM

William H. Meiklejohn, Scotia, N.Y., assignor to General Electric Company, a corporation of New York Filed June 1, 1964, Ser. No. 371,457
7 Claims. (Cl. 340—347)

ABSTRACT OF THE DISCLOSURE

An array of superconductive gates defining the digits of a binary number by their state of conduction and controlled by a plurality of conductive members associated with the superconductive gates in such a pattern that changing digital information in the conductive member correspondingly changes the binary number represented by the superconductive gates. The conductive members are coupled to the selective ones of the gates and paired in polarity opposition such that increasing digital information in the conductive members produces an increase in the normal order of a binary number.

This invention relates to superconductive apparatus and more particularly to a superconductive apparatus for converting information to binary digital form.

A difficulty inherent in the use of computers, controllers and related apparatus is that of converting information into a coded digital form, for example, the binary code. There are many situations wherein analog or digital quantities such as electrical current must be converted by relatively laborious and time-consuming procedures into the binary digital form before the information can be used in particular machines. In my copending application Ser. No. 113,260, filed May 29, 1961, and assigned to the assignee of the present invention, there is disclosed and claimed a a superconductive analog to digital converter which greatly simplifies and facilitates the conversion of information in analog form to digital form. The remaining conversion from digital to binary digital form still requires complex apparatus.

Accordingly, it is a principal object of the present invention to provide an apparatus for converting information into coded digital form.

Another object of the present invention is the provision of apparatus for converting information from digital form into binary digital form.

A further object of this invention is the provision of apparatus for converting information from analog into binary digital form.

An additional object of this invention is to provide a superconductive apparatus for measuring unknown quantities of electric current in coded digital form.

Figure 1:
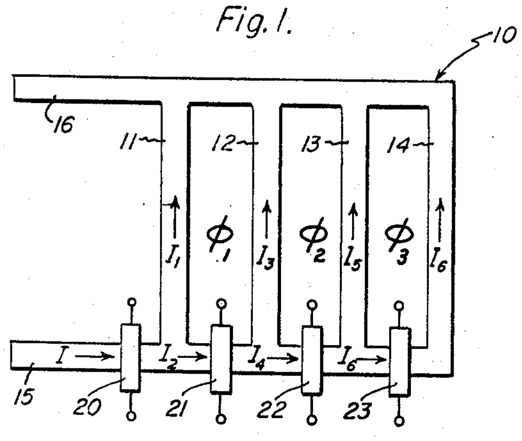
Figure 2A:
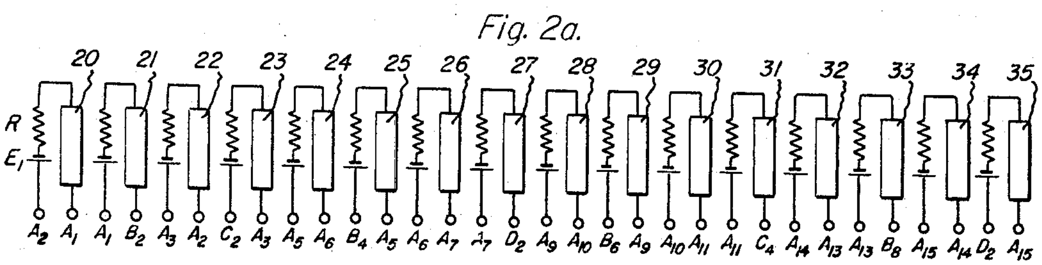
Figure 2B:
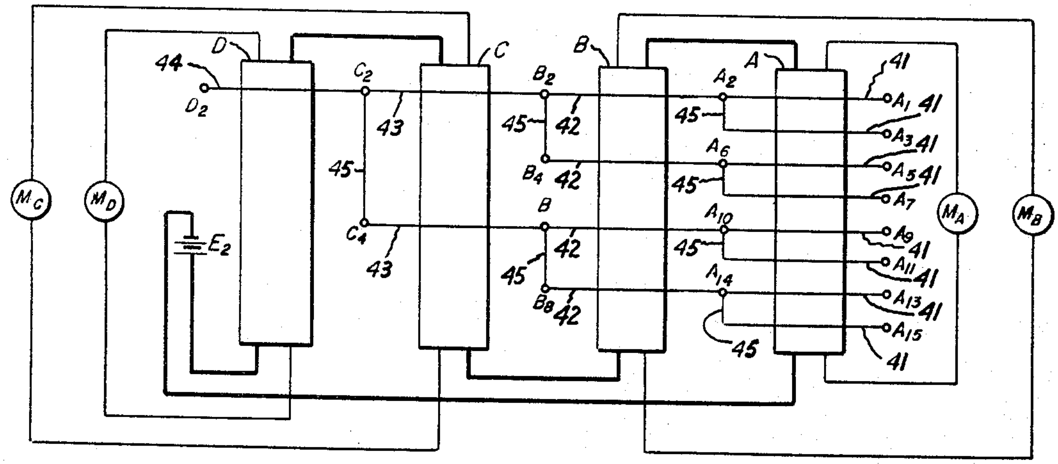
Figure 3:
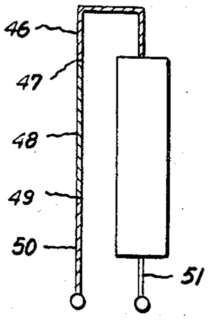

Other objects and advantages of this invention will be in part obvious and in part explained by reference to the accompanying specification and drawings in which:

FIG. 1 is a schematic drawing illustrating the apparatus of my aforementioned copending application;

FIGS. 2*a* and 2*b* are schematic illustrations of apparatus constructed according to the present invention; and FIG. 3 is a schematic illustration of an alternative form of the circuits shown in FIG. 2*a*.

Briefly, in accord with one embodiment of the present invention, a set of superconductive elements or gates is provided for receiving information in digital form. The gates are cooled so as to be superconductive and incoming information converts a number of gates corresponding to its magnitude to the normally conductive condition. Each of the gates is connected in series with a potential source to form a circuit. Each circuit accordingly carries a given current when the gate therein is superconductive and a reduced current when the gate is normally conductive.

The conductors in the several circuits are disposed in cooperative relationship with and are insulated from a second set of superconductive elements or gates in such a manner that a unique coded number, for example a binary number, is produced in the second set of gates for each unit increase in the number of gates of the first set which have switched from superconductive to normally conductive. The binary numbers are defined by considering each one of the second set of gates as a digit having a "1" or "0" value corresponding to its condition of conductivity. The pattern of connection of the circuits to the second set of gates is so defined as to produce unique binary numbers.

In further accord with my invention, the apparatus of my aforementioned copending application is provided in combination with the digital to binary digital converter just described. Specifically, the apparatus has a grid including a plurality of conductors of selected resistances connected in parallel between input and output conductors and a plurality of superconductive elements or gates mounted in cooperative relationship with and electrically insulated from the grid. The superconductive elements are within the magnetic field surrounding the conductors which comprise the grid when current is flowing therethrough. An input current in analog form is divided among the conductors of the grid, each portion bearing a known relation to the input current. Depending on the input current magnitude, one or more of the superconductive elements beginning with that carrying the largest current portion become normally conductive due to the effect of the magnetic field. These gates are then connected as the first set of gates in the digital to binary digital converter described above.

For a clearer understanding of the nature of the present invention, reference is made to the drawings where an example of a suitable superconductive apparatus is illustrated. In FIG. 1, an embodiment of the analog to digital converter of the aforementioned application is illustrated. Specifically, a superconductive grid 10 comprises a plurality of electrical conductors 11, 12, 13 and 14, connected in parallel between input conductor 15 and output conductor 16. The parallel conductors and the input and output conductors are constructed of a material which can be rendered superconductive at low temperatures and which may be either in the form of wires or of flat ribbons deposited from a vapor state on a suitable substrate. The input conductor 15 and the output conductor 16 are appropriately connected to the ends of the parallel conductors 11–14.

Accordingly, an input current, I, introduced into the system via conductor 15 divides among the parallel conductors in accordance with Kirchoff's law into the currents $I_2$, $I_3$, $I_4$, $I_5$ and $I_6$. As a second condition, the fluxes $\phi_1$, $\phi_2$ and $\phi_3$ through the enclosed areas must be constant, preferably zero. Given these conditions, the relation of the currents $I_i$ to the input I may be computed.

A number of superconductive elements or gates 20, 21, 22, and 23 are mounted in cooperative relationship with and are electrically insulated from the input conductor 15. Due to the close proximity of the superconductive elements to the grid, the elements are located within the magnetic field surrounding the conductors when current is flowing therethrough. It is essential that the superconductive elements 20–23 be constructed of a material which becomes superconductive at a lower critical magnetic field than the material used to make the grid conductors 11–16. Thus a current of predetermined magnitude flowing in a given portion of the grid causes the associated element to become normally conductive, or resistive, without affecting the conductivity state of the grid itself.

Digitalized information regarding the magnitude of the input current I is obtained from this apparatus through the condition of the superconductive gates 20–23. Since the magnitude of the current required to switch any of these gates from superconductivity to normal conductivity is known and since the proportion of the input current flowing in any of the grid portions associated with the gates is readily computable, the highest numbered gate which switches to a normal conductivity state and the lowest numbered gate which remains superconductive put limits on the magnitude of the input current.

The present invention is illustrated schematically in FIGS. 2*a* and 2*b* which represent the circuit divided into two portions for ease of illustration and discussion. The superconductive elements 20–23 correspond to those shown in FIG. 1 and the elements 24–35 are similar and would be used in a case where the grid of FIG. 1 had 16 parallel conductors rather than four. As illustrated in FIG. 2*a*, each of the elements or gates 20–35 is connected in a circuit containing a resistance R and a battery or source of potential $E_1$. The resistance R preferably represents only the resistance of the leads and the internal resistance of the potential source $E_1$.

Conversion of the digital information represented by the condition of the gates 20–35 into binary digital form is accomplished through the connection of the circuit terminals to the circuit illustrated in FIG. 2*b* in the order indicated by the letters $A_1$, $A_2$, etc.

In FIG. 2*b*, a further plurality of superconductive elements or gates A, B, C, D, may be in the form of either wires or flat ribbons deposited from a vapor state onto a suitable substrate. A plurality of conductors 41, 42, 43 and 44 extend respectively across each of the gates and are mounted in cooperative relationship with and are electrically insulated from the respective gates. Interconnection conductors 45 are provided to properly complete the array.

The conductors 41–44 are preferably superconductive. Alternatively, these may be normal conductors if their resistance is small compared to the value of R in FIG. 2*a*. Larger values of resistance might cause the currents to choose undesired paths through the batteries rather than through the conductors 41–44. These conductors are so related to the gates A–D that a current charge caused by the switching of one of the gates of FIG. 2*a* causes a magnetic field change which converts the associated gate or gates in the second set from a superconductive state to a normally conductive state. It is essential, if the conductors 41–44 are superconductive, that they be constructed to remain superconductive at a higher critical magnetic field than the gate elements A–D. Thus a current of predetermined magnitude flowing in a given conductor 41–44 causes the associated gate or gates to become normally conductive without affecting the conductivity state of the conductor itself.

As will be understood from a consideration of FIGS. 2*a* and 2*b*, connection of the circuits of FIG. 2*a* to the terminals $A_1$, $B_1$, $C_1$ and $D_1$ in accordance with the lettering in FIG. 2*a* results in the creation of a unique binary number for each increase in the number of gates 20–35 which have been switched from superconductive to normally conductive. Specifically, with no input current, two currents equal in magnitude and opposite in direction appear in each of the conductors 41–44. Accordingly, the magnetic fields created by these currents cancel, all of the gates A–D are in the superconductive condition, and the binary number represented by the gates DCBA is 0000. If an input current sufficient to switch gate 20 from superconductive to normally conductive is applied in FIG. 1, the circuit including element 20 in FIG. 2*a* undergoes a reduction in current and the current through conductor 41 between terminals $A_2$ and $A_1$ in the direction $A_2$–$A_1$ becomes reduced. Since there is no corresponding reduction in the current therethrough in the direction $A_1$–$A_2$ created by the circuit of FIG. 2*a* including element 21, a net magnetic field results and the gate A is switched to the normally conductive state. Accordingly, the binary number 0001 appears in the gates DCBA.

If the input current in FIG. 1 is now increased to a magnitude sufficient to switch both elements 20 and 21 to normal conduction, the circuit of FIG. 2*a* including element 21 undergoes a current reduction and the current through conductors 41 and 42 between terminals $A_1$ and $B_2$ in the direction $A_1$–$B_2$ becomes reduced. Accordingly, gate A is returned to the superconductive state since the opposing currents between terminals $A_1$ and $A_2$ are both reduced in magnitude, leaving no net magnetic field. However, the current through conductor 42 between terminals $B_2$ and $A_2$ in the direction $A_2$–$B_2$ has been reduced, leaving the current in the direction $B_2$–$A_2$ which arises from the circuit including element 23, unbalanced. A net magnetic field therefore appears across gate B, switching it to the normally conductive condition and accordingly the binary number 0010 is produced.

Similar analysis applied to increasing magnitudes of input current shows that a total of sixteen unique binary numbers are produced corresponding to the sixteen digits represented by the elements 20–35. In general, unique binary numbers may be defined by using the following pattern of association: all of the circuits of FIG. 2*a* are associated with the first gate of FIG. 2*b* and successive pairs of these circuits are associated with the gates in polarity opposition; that is, the circuits in each pair are connected so that the currents produced in the conductors 41 are in opposing direction. Every second one of the circuits in FIG. 2*a* is also associated with the second gate of FIG. 2*b* with successive pairs of these circuits being connected in polarity opposition. Every fourth circuit is also associated with the third gate and successive pairs are connected in polarity opposition. This pattern is continued and, in general, the $2^{nth}$ circuits are associated with the $(n+1)^{th}$ gate and are paired in polarity opposition where $n$ is an integer varying from 0 to one less than the total number of gates in the second set.

It can be seen from the above that the present invention, as represented in FIGS. 2*a* and 2*b* provides a simple and effective apparatus for converting digital information into binary digital form. Secondly, by combination with the apparatus of FIG. 1, an analog to binary digital converter is provided which combines the output elements of the analog to digital converter and the input elements of the digital to binary digital converter, thus reducing the complexity of the circuitry which would otherwise be required.

Also included in FIG. 2*b* is the readout means for determining the binary digital number defined by the gates D, C, B, and A. The readout means comprises a battery $E_2$ connected in series with all of the gates, A, B, C and D, and a plurality of meters or other suitable indicators, $M_A$, $M_B$, $M_C$ and $M_D$, each connected to one of the gates, A, B, C, D, for indicating whether the respective gates are superconductive or normally conductive. The battery $E_2$ produces a current flow through the gates DCDA. The respective meters indicate the presence or absence of a voltage drop across each gate, depending on the conduction state of the gate, and thus indicate a 1 or a zero digit in the binary number.

Referring again to FIG. 2*a*, the batteries $E_1$ in each of the circuits may comprise any appropriate source of potential but may, in a preferred embodiment, comprise thermocouples of any two materials which produce a sufficient voltage to produce the requisite magnetic fields at cryogenic temperatures. FIG. 3 illustrates such an arrangement, by way of example, in the circuit including the element 20. Conductor 46, composed, for example, of gold with 2 atomic percent iron, extends from one end of element 20 to a junction 47 with conductor 48 which is composed, for example, of copper. Junction 47 is conveniently placed adjacent element 20 and is maintained at approximately the same temperature. Conductor 48 then extends to a second junction 49 with conductor 50, composed of the same metal as conductor 46. Junction 49 is maintained at a temperature slightly above that of junction 47 so as to produce a potential difference therebetween. As previously noted, the resistances R of FIG. 2*a* preferably represent only the internal resistance of the potential source and the resistance of the conductors.

Conductors 50 and 51 are then connected respectively to terminals $A_2$ and $A_1$ of FIG. 2*b* and a current of a magnitude determined by the condition of element 20 flows in the circuit. The remaining batteries $E_1$ of FIG. 2*a* may comprise similar arrangements.

The discussion and illustration of the present invention thus far has been directed to a particular embodiment which is a preferred form. However, it is noted that the present invention includes many other alternatives. For example, any set of sequentially changed current conductors may be used in place of the superconductive elements of FIG. 2*a*. Also, in the case of the combined apparatus, the grid of FIG. 1 may use a plurality of normal conductors having a predetermined resistance disposed therein. Further, the system of interconnection of the gates 20–35 to the conductors 41–44 is intended as examplary only, there being other patterns which would also accomplish the formation of unique coded numbers in correspondence to the digital information presented by the elements 20–35.

In general, it is fully understood that modifications and variations may be resorted to without departing from the spirit and scope of the invention, as those skilled in the art will readily understand. Such modifications and variations are considered to be within the purview and scope of the invention and of the appended claims.

What I claim as new and desire to secure by Letters Patent of the United States is:

1. In apparatus for converting information into binary digital form, the comibnation comprising: a plurality of superconductive elements adapted to be switched to normal conduction in response to varying input information; a second plurality of superconductive elements arranged to indicate by their conductivity state the successive digits of a binary number; and conductive means connecting each of said first plurality of superconductive elements in a separate circuit, each of said circuits including a source of potential comprising thermocouples having one bimetallic junction maintained at the temperature of said first plurality of superconductive elements and a second bimetallic junction maintained at a higher temperature each of said conductive means being disposed adjacent to and electrically insulated from said second plurality of superconductive elements; said conductive means being mangetically linked to said superconductive elements in such a pattern as to create a unique binary number for each change in the number of said first plurality of said superconductive elements which switch to normal conduction.

2. In apparatus for converting information into binary digital form, the combination comprising: a plurality of superconductive elements, said superconductive elements being sequentially switched to normal conduction in response to input information of increasing magnitude to produce a digital representation of said input information; a second plurality of superconductive elements arranged to indicate by their conductivity state the successive digits of a binary number; conductive means connecting each of said first plurality of superconductive elements in a separate circuit, said conductive means being mounted adjacent to and electrically insulated from said second plurality of superconductive elements and magnetically linked thereto so that said second elements are in the magnetic field surrounding said conductive means when current is flowing therethrough; said circuits carrying a first current when said element therein is superconductive and a second, reduced current when said element switches to normal conduction; the magnetic field change accompanying said current change being sufficient to switch the associated elements of said second plurality of superconductive elements; the pattern of association between said conductive means and said second elements being such that said second elements are magnetically linked to a geometrically increasing number of said conductive means with digital information of an incrementally increasing number switching selected second elements in a preselected order from a superconductive state to a normal state, the order of switching corresponding to the order of a binary coded number.

3. In apparatus for converting information into binary digital form, the combination comprising: a plurality of superconductive elements adapted to be sequentially switched to normal conduction in response to input information of increasing magnitude; a second plurality of superconductive elements arranged to indicate by their conductivity state the successive digits of a binary number; and conductive means connecting each of said first plurality of superconductive elements in a separate circuit, said conductive means being mounted adjacent to and electrically insulated from at least one of said second plurality of superconductive elements and magnetically linked thereto according to the pattern defined as follows: each of said circuits is mounted in cooperative relationship with and electrically insulated from the first element of said second plurality, successive pairs of said circuits being in polarity opposition; each second one of said circuits is mounted in cooperative relationship with and electrically insulated from the second element of said second plurality, successive pairs of said second circuits being paired in polarity opposition; each fourth one of said circuits being mounted in cooperative relationship with and electrically insulated from the third of said second plurality, successive pairs of said fourth circuits being in polarity opposition; . . . each $2^{nth}$ of said circuits being mounted in cooperative relationship with and electrically insulated from the $(n+1)^{th}$ of said second plurality, successive pairs of said $2^{nth}$ circuits being paired in polarity opposition; said pattern creating a unique binary number for each increase in the number of said first plurality of superconductive elements which switch to normal conduction.

4. In an analog to binary digital converter, the combination comprising: a grid including a plurality of conductors of selected resistances connected in parallel between input and output conductors; a first plurality of superconductive elements mounted in cooperative relationship with and electrically insulated from said grid, said superconductive elements being seqeuntially switched in response to input information of increasing magnitude being applied to said grid to produce a digital output signal, at least one of said elements being associated with one of said plurality of said conductors; a second plurality of superconductive elements arranged to indicate by their conduttivity state the successive digits of a binary number; and conductive means connecting each of said first plurality of superconductive elements in a separate circuit, said conductive means being mounted in cooperative magnetically coupled relationship with and electrically insulated from said second plurality of superconductive elements, the pattern of association being such that each said second plurality superconductive element is magnetically linked to a geometrically increasing number of said conductive means with digital information of an incrementally increasing number switching selected of said second plurality of superconductive elements in a preselected order from a superconductive state to a normal state, the order of switching corresponding to the order of a binary coded number.

5. An apparatus for converting information to coded digital form comprising: a plurality of conductive elements, means for applying input information in digital form to said plurality of conductive elements, current flow in said conductive elements varying in response to the selected digital information applied to said conductive elements, a plurality of superconductive elements, said plurality of superconductive elements being electrically insulated from and magnetically linked to said conductive elements, selected ones of said superconductive elements being switched in a binary coded order from a superconductive state to a normal state in response to a digital information of an incrementally increasing number, alternate of said successive digital numbers of increasing magnitude producing an equal and opposite current flow along at least a portion of the conductive element energized by said immediately preceding digital signal, said portion of the conductive element being magnetically linked to at least one said superconductive element, and readout means connected to said plurality of superconductive elements to provide an output signal characteristic of the digits of a binary coded number.

6. An apparatus for converting information into coded digital form according to claim 5 wherein each said superconductive element is magnetically linked to a geometrically increasing number of said conductive elements, and said means for applying input information in digital form to said plurality of conductive elements comprise a source of potential and a superconductive element adapted to be switched to normal conduction in response to varying input information, said source of potential and said superconductive element being connected in a separate circuit with each said conductive element.

7. An apparatus for converting information to coded digital form according to claim 3 wherein said means for applying said input information in digital form to said plurality of said digital form comprises: a grid including a plurality of conductors of selected resistances connected in parallel between input and output conductors, a first plurality of superconductive elements mounted in cooperative relationship with and electrically insulated from said grid, at least one of said elements being associated with one of said plurality of said conductors.

References Cited

UNITED STATES PATENTS

| | | | |
|---|---|---|---|
| 3,196,427 | 7/1965 | Mann | 340—347 |
| 3,275,843 | 9/1966 | Meyerhoff | 307—88.5 |

MAYNARD R. WILBUR, *Primary Examiner.*

J. H. WALLACE, *Assistant Examiner.*